US007131117B2

(12) United States Patent
Mills et al.

(10) Patent No.: US 7,131,117 B2
(45) Date of Patent: Oct. 31, 2006

(54) METHOD AND SYSTEM FOR AUTOMATING THE ANALYSIS OF WORD FREQUENCIES

(75) Inventors: Scott H. Mills, Austin, TX (US); Kurt M. Joseph, Austin, TX (US); Robert R. Bushey, Cedar Park, TX (US); John M. Martin, Austin, TX (US); Benjamin A. Knott, Round Rock, TX (US); Theodore B. Pasquale, Austin, TX (US)

(73) Assignee: SBC Properties, L.P., Reno, NV (US)

( * ) Notice: Subject to any disclaimer, the term of this patent is extended or adjusted under 35 U.S.C. 154(b) by 588 days.

(21) Appl. No.: 10/234,398

(22) Filed: Sep. 4, 2002

(65) Prior Publication Data

US 2004/0044950 A1    Mar. 4, 2004

(51) Int. Cl.
*G06F 9/44* (2006.01)
*G06F 15/00* (2006.01)
*G06F 17/21* (2006.01)

(52) U.S. Cl. .................. 717/141; 715/531; 704/10
(58) Field of Classification Search ................ 717/141; 707/3, 4, 102; 715/531; 704/10
See application file for complete search history.

(56) References Cited

U.S. PATENT DOCUMENTS

| | | | | |
|---|---|---|---|---|
| 4,773,009 A * | 9/1988 | Kucera et al. | ............... | 715/531 |
| 5,218,538 A * | 6/1993 | Zhang | ......................... | 715/534 |
| 5,642,518 A | 6/1997 | Kiyama et al. | ............. | 395/757 |
| 5,742,834 A * | 4/1998 | Kobayashi | ................... | 704/10 |
| 5,845,278 A * | 12/1998 | Kirsch et al. | ................... | 707/3 |
| 5,924,105 A | 7/1999 | Punch et al. | ................. | 707/513 |
| 5,924,108 A | 7/1999 | Fein et al. | ................... | 707/531 |
| 5,930,809 A * | 7/1999 | Middlebrook | ............... | 715/780 |
| 6,038,561 A * | 3/2000 | Snyder et al. | ................. | 707/6 |
| 6,104,990 A | 8/2000 | Chaney et al. | ................. | 704/9 |
| 6,212,517 B1 | 4/2001 | Sato et al. | ..................... | 707/5 |
| 6,236,768 B1 | 5/2001 | Rhodes et al. | ............. | 382/306 |
| 6,556,987 B1 * | 4/2003 | Brown et al. | .................. | 707/3 |
| 6,823,333 B1 * | 11/2004 | McGreevy | ...................... | 707/4 |
| 2004/0044950 A1 * | 3/2004 | Mills et al. | ................. | 715/500 |

FOREIGN PATENT DOCUMENTS

| | | |
|---|---|---|
| JP | 57182279 | 11/1982 |
| JP | 4280359 | 10/1992 |

* cited by examiner

*Primary Examiner*—Tuan Dam
*Assistant Examiner*—Isaac Tecklu
(74) *Attorney, Agent, or Firm*—Baker Botts L.L.P.

(57) ABSTRACT

A method and system for automating the analysis of word frequencies includes a frequency system automatically analyzing a plurality of statements, a count engine, and a cluster engine. The count engine allows for the counting of unique words in the statements and the determination of a frequency of occurrence for each unique word. The frequency system further includes a phrase file allowing for the count engine to specify groups of words as single unique words and a synonym file allowing for the count engine to group one or more words together in synonym groups to be specified as single unique words. The cluster engine locates a plurality of clusters in the statements and determines a cluster frequency of occurrence for each of the clusters. The automated analysis of the statements allows for cost savings, more efficient use of time, and more reliable and consistent word frequency results.

33 Claims, 3 Drawing Sheets

METHOD AND SYSTEM FOR AUTOMATING THE ANALYSIS OF WORD FREQUENCIES

TECHNICAL FIELD OF THE INVENTION

The present invention relates generally to information processing and information management, and more specifically relates to a method and system for automating the analysis of word frequencies.

BACKGROUND OF THE INVENTION

Customers often call a company service center or access a company's web page with problems or questions about a product or service or to alter their existing service. When calling, customers often speak to customer service representatives (CSR) or interact with interactive voice response (IVR) systems and explain the purpose of their inquiry in the first statement made by the customers whether that be the first words spoken by the customers or the first line of text from a web site help page or an email. These statements made by the customers are often referred to as opening statements and are helpful in quickly determining the purpose of the customers' inquiries.

Companies may track and analyze the opening statements provided by the customers in order to better understand the words or terminology used by the customers when referring to particular products and services. Companies typically manually track the statements provided by the customers and manually analyze the statements in order to determine generally what words the customers are using and specifically what words the customer use the most frequently. But manual analysis of the opening statements is a repetitive and tedious task that is costly and time consuming for the companies.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
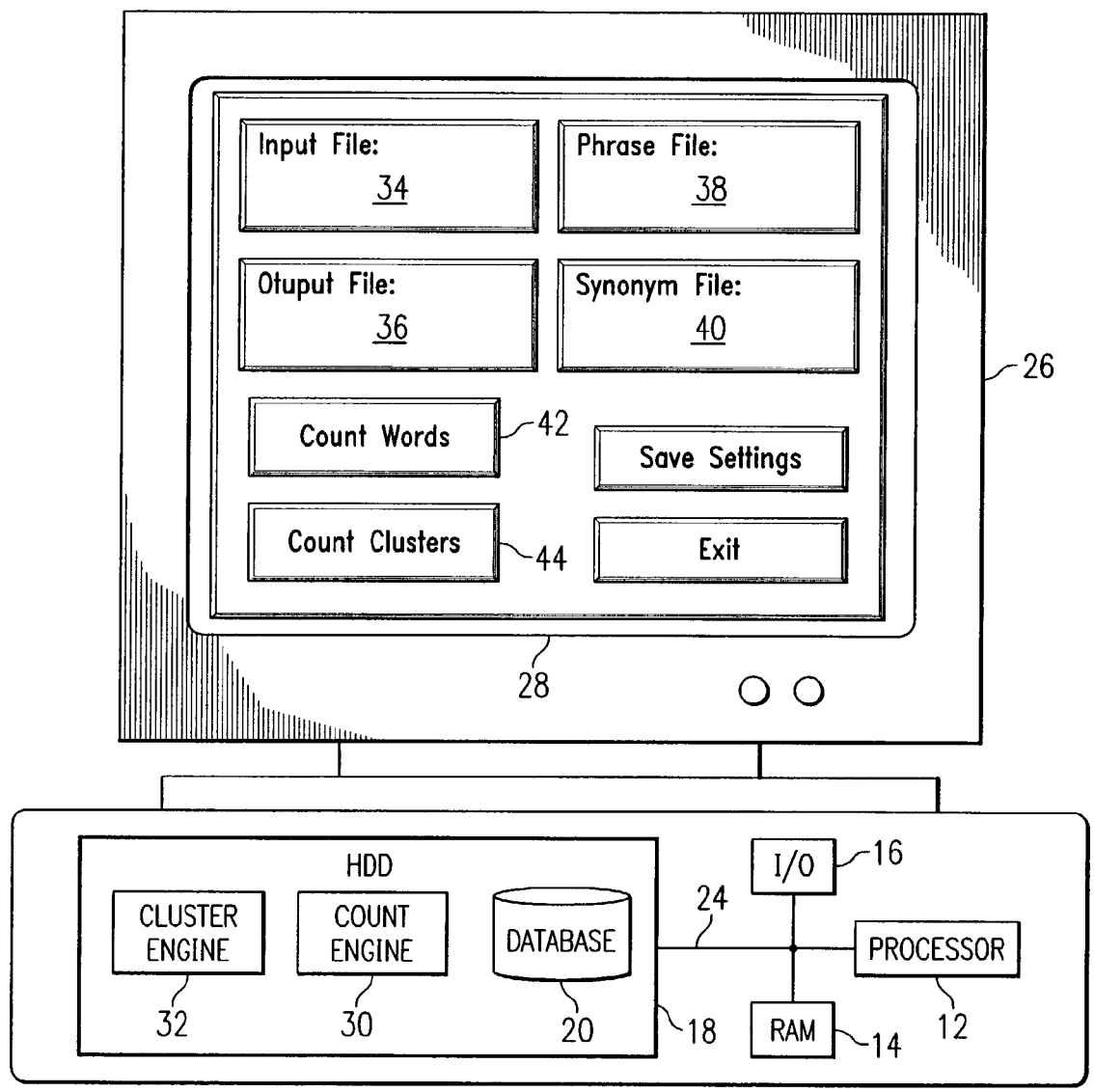
FIG. 1 depicts a block diagram of a system for the automated analysis of word frequencies.

Preferred embodiments of the present invention are illustrated in the figures, like numerals being used to refer to like and corresponding parts of the various drawings.

Many companies that have customer service programs and/or call centers, such as telephone companies, Internet service providers, and credit card companies, often track statements made by customers when the customers contact the company with problems or questions about a product or service or to alter a product or service. When a customer calls a service number and speaks to a customer service representative (CSR), the customer typically tells the CSR the purpose of the call in the first substantive statement the customer makes. Alternatively, a customer may contact a company via the company web site or email and generally the first substantive statement made in the email or web site statement includes the customer's purpose for contacting the company. These initial statements containing the purpose of the customer's call are often referred to as opening statements.

These opening statements can be used by companies to better design web sites, interactive voice response (IVR) systems, or any other interfaces between a company and the customers to allow for quick and easy navigation by the customer of the interface. One effective way to design an IVR system interface or a web site is to analyze the scripts of incoming calls or emails to a customer support center or call center to locate the opening statements in order to get an idea of what words the customers are using when referring to particular products and services. The frequency that the customers use specific words can be tracked so that the company learns how the customers most often refer to products and services. For instance, a telephone company may want to know whether customers say "purchase," "buy," or "acquire" the most often when wanting to add a new product or service to their residential telephone line. Once a company knows the frequency of the words that the customers use, an IVR system can be designed that incorporates the most frequently used customer words so that customers calling with common problems, complaints, or questions can be serviced quickly and efficiently.

Once a company has determined the words the customers are using, how often the customers use them, and how the customers' words relate to the products and services, the company can design a customer-centric interface organized in accordance with the way the customers think and not the company's way of thinking or organizational structure. For example, an IVR system includes numerous scripted menu prompts and these menu prompts are scripted using the words of the customers. Because the customers' words are used, the customers are more likely to understand the various menu prompts and therefore navigate the IVR system more easily and more quickly accomplish the tasks for which they called. Because the customers are able to easily navigate the interface and accomplish their tasks, the customers have a higher level of satisfaction for both the interface and the company.

In order to maximize the utilization of the words used by the customers in the statements given by the customers in a customer-centric interface, a company therefore needs to track and analyze the words used in the statements. Typically, companies have manually tracked and manually counted the words used in the opening statements. The company manually tracks each call and manually records and transcribes each opening statement spoken to a CSR or received via email and then creates a list of the opening statements. An employee of the company reads the long list of opening statements and writes down every unique word from every opening statement in the list and keeps track of how many times each word is used. In addition, the employee must also search for groups of words or phrases that only count as one unique word or for synonym words, such as "e-mail" and "email," that only count as one unique word. Manual analysis has proved to be a very time consuming and costly process because one or more people manually examining every opening statement, recording the words used, determining the frequency of occurrence requires a large amount of employee time which is expensive and would be better utilized in a revenue generating task.

In addition to the cost and man-power required for the manual counting and recording of the words in the opening statements, there is also a human error factor that affects the reliability of the word count data. Because the employee examines numerous opening statements and records each unique word, after several hundred opening statements, fatigue may become a factor and the employee may begin to do sloppy work and miss words or entire opening statements or make an error with the frequency count. Human error factor creates an inconsistency in the word count data and the frequency count that results in unreliable data and a resulting customer interface that is not optimized with respect to the opening statements and the customers own words.

By contrast, the example embodiment described herein allows for the automated analysis of word frequencies. Additionally, the example embodiment allows for the consistent analysis of word frequencies from the statements free of human error. Time and money is saved because employees no longer manually examine the statements recording each unique word used by the customers and determining a frequency of occurrence for each unique word in the statements. Therefore, employees' time may be better utilized in other revenue generating projects since less time is required to analyze the statements for word frequencies. Furthermore, the analysis of the statements for word frequencies is more reliable because the analysis is not subject to human error such as calculation errors and fatigue-induced errors. This results in consistent and reliable word frequency data that can be used in the design and creation of customer-centric interfaces.

Referring now to FIG. 1, a block diagram depicts frequency system 10 for automating the analysis of word frequencies. In the example embodiment, frequency system 10 may include respective software components and hardware components, such as processor 12, memory 14, input/output ports 16, hard disk drive (HDD) 18 containing database 20, and those components may work together via bus 24 to provide the desired functionality. The various hardware and software components may also be referred to as processing resources. Frequency system 10 may be a personal computer, a server, or any other appropriate computing device. Frequency system 10 also includes count engine 30 and cluster engine 32, which reside in memory such as HDD 18 and are executable by processor 12 through bus 24.

Figure 2:
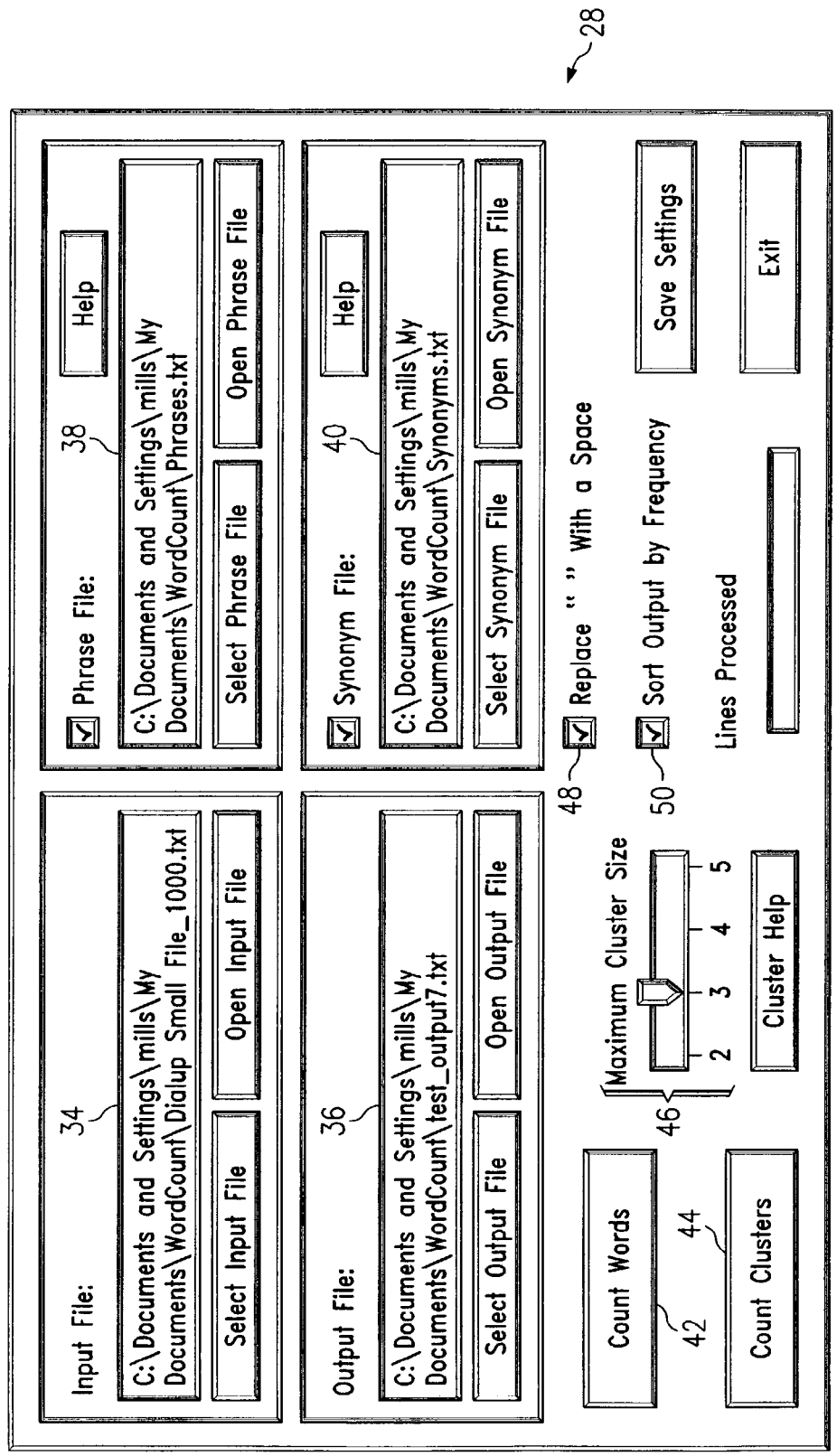
FIG. 2 illustrates an example graphical user interface.

Frequency system 10 may further include display 26 for presenting graphical user interface (GUI) 28 and input devices such as a mouse and a keyboard. Display 26 presents GUI 28 which allows for the selection of the opening statements for frequency system 10 to automatically analyze and for the presentation of some of the analysis results. Shown in FIG. 1 is an example GUI 28 with GUI 28 illustrated in greater detail in FIG. 2. GUI 28 includes a plurality of screens and buttons that allow the user of frequency system 10 to access and control the operation of frequency system 10, count engine 30, and cluster engine 32.

Frequency system 10 allows for the automated analysis of one or more files containing statements and the generation of an output file including the results of the analysis on the statements. Although the example embodiment is described in reference to opening statements, in alternate embodiments frequency system 10 may also automatically analyze other types of statements such as e-mails, web site help page comments, customer feedback comments, FAQs, survey responses, complaints, written statements from a training session, search statements from a web site, statements evaluating a customer's experience and satisfaction in a test environment, or any other appropriate response to an open-ended question.

Figure 3:
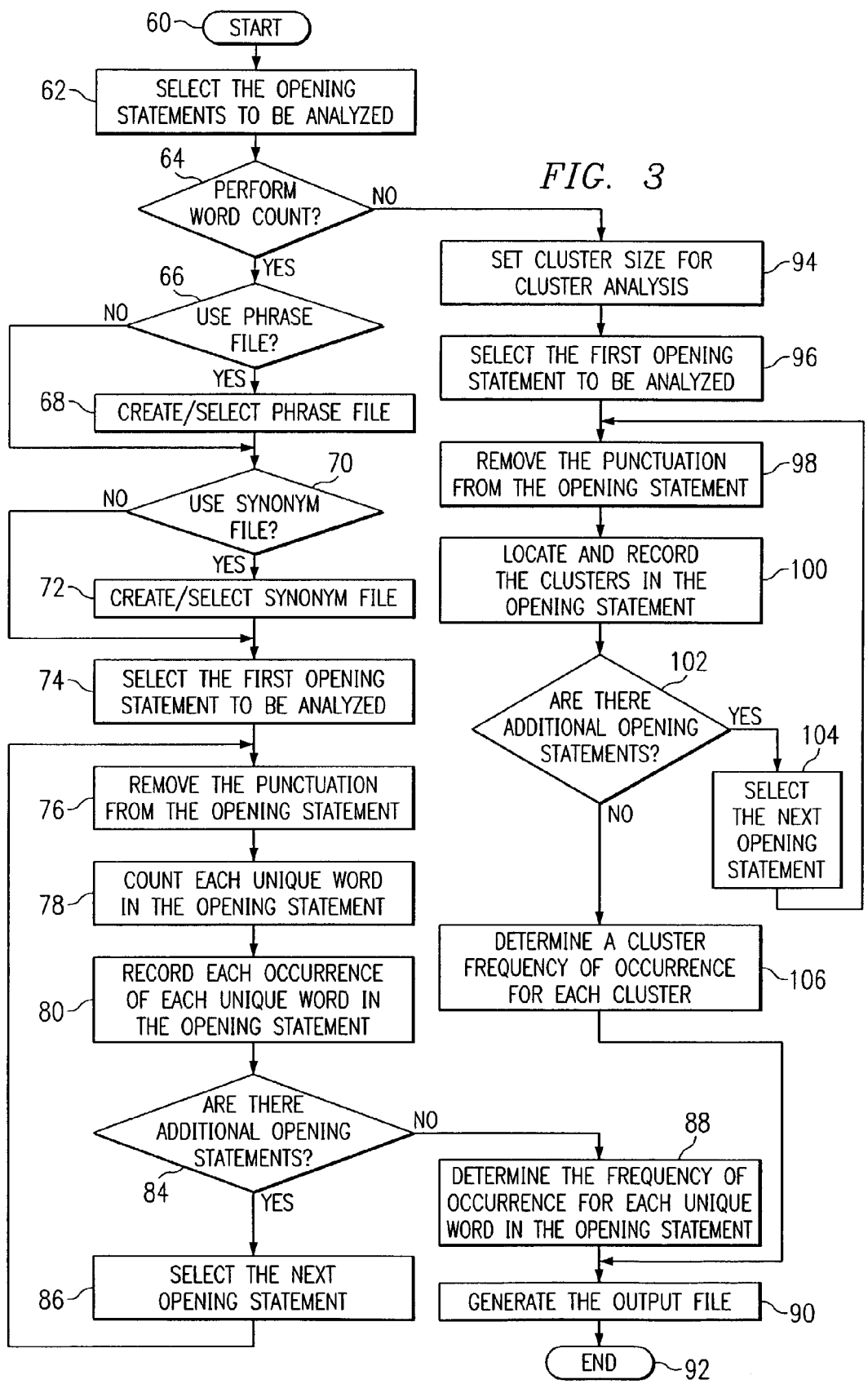
FIG. 3 depicts a flow diagram of a method for automating the analysis of word frequencies.

FIG. 3 depicts a flow diagram of a method for automating the analysis of word frequencies. The method begins at step 60 and at step 62 a user of frequency system 10 selects the opening statements to be analyzed. Before frequency system 10 can automatically analyze the opening statements for word frequencies, the user must have one or more opening statements to categorize and therefore load the list of opening statements into frequency system 10.

Typically, the opening statements are recorded, transcribed, configured in a format that can be understood by frequency system 10, and then placed in a text file which may be stored in database 20. Because there may be more than one list of opening statements and therefore more than one text file, the user chooses which list of opening statements to analyze by selecting a text file using input screen 34. Input screen 34 allows the user to view all the available text files containing opening statements and then select the text file containing the list of opening statements that the user wants to analyze for word frequencies. Once the list of opening statements has been selected, frequency system 10 accesses and reads the list of opening statements from database 20.

After the selection of the opening statements to be analyzed for word frequencies, at step 62 the user decides whether to perform a word count to determine a frequency of occurrence for every word in the opening statements. If the user decides to perform a word count, then at step 66 the user decides whether to apply a phrase file to the word count frequency analysis.

By default, frequency system 10 and count engine 30 treat each word encountered in the opening statements as unique and therefore counts each unique word in the opening statements. Frequency system 10 defines a word as a letter or string of letters separated from other letters by a space or a letter or string of letters at the beginning and end of an opening statement. For instance, an example opening statement of, "I want to pay my phone bill" includes seven unique words by default.

The user can override the default word definition for specified phrases or groups of words by creating and using a phrase file. The phrase file includes one or more groups of words that the user wants to be considered as a single unique word. For instance, a phrase file may include the following phrases: "credit card," "DSL service," "phone number," "phone bill," "account number," "acct number," and "acct #." Each time count engine 30 encounters a phrase in an opening statement, count engine 30 only counts one occurrence for the phrase and does not count an individual occurrence for the separate words composing the phrase. For example, an opening statement may be, "I want to pay my phone bill." By default, count engine 30 counts one occurrence of each word in the above opening statement, including "phone" and "bill" for a total of seven unique words. However, the user can include "phone bill" in the phrase file and select the phrase file so that count engine 30 counts one occurrence for "phone bill" but does not count one occurrence for "phone" or "bill" resulting in six unique words with "phone bill" counting as one unique word. Therefore, the words "phone" and "bill" are no longer counted as two separate unique words when occurring together as "phone bill." Count engine 30 only counts "phone bill" once and count engine 30 does not increase the frequency count for "phone" and "bill," only for "phone bill." But in the opening statement of "I want to pay my bill and add a second phone line," count engine 30 counts each occurrence of "phone" and "bill" as two unique words because the phrase "phone bill" does not appear in the opening statement.

So if at step 66 the user decides to apply a phrase file, then at step 68 the user either creates a new phrase file or selects an existing phrase file using phrase screen 38. Frequency system 10 may have more than one existing phrase file stored in database 20 because different users may have different phrases that they are interested in. For example, the marketing division of a company may be interested in different phrases than the engineering design division and therefore there may be a marketing phrase file and an engineering design phrase file stored in database 20. Database 20 stores as many phrase files as needed by the different users of frequency system 10. Each phrase file may include as many or as few phrases as needed by the particular user. For instance, one phrase file may include ten phrases while another phrase file includes only one phrase.

After the user has created or selected a phrase file at step 68 or if the user does not use a phrase file at step 66, then at step 70 the user decides to apply a synonym file. If the user does not use a synonym file at step 70, the process proceeds to step 74. But if the user selects to use a synonym file at step 70, then at step 72 the user either creates a new synonym file or selects an existing synonym file from a list of existing synonym files stored in database 20 using synonym screen 40. Just as with the phrase files, frequency system 10 may have more than one existing synonym file stored in database 20 because different users may have different synonyms of interest. Database 20 stores as many synonym files as needed by the different users of frequency system 10 and each synonym file includes as many or as few synonym words as needed by the particular users.

The synonym file allows for the user to specify words or groups of words that should be treated as a single unique word when encountered in the opening statements. Typically the opening statements are transcribed from a verbal communication by more than one transcribers. Therefore, the words in the opening statements are not always transcribed, including spellings and abbreviations, in the same manner. For example, the phrase "account number" may be transcribed in the opening statements as "account number," "acct number," "account #," "acct #," or "act #." Having a separate count for each version of "account number" results in having to spend additional time reviewing the results of the word frequency analysis in order to get a total frequency of occurrence for "account number." The user of frequency system 10 is not interested in the many different spellings and abbreviations of "account number" but is interested in the total number of occurrences for all variations of "account number." But with use of the synonym file, a majority of the variations of "account number" are counted and recorded as one single unique word instead of five different unique words and the user has an accurate result for the frequency of occurrence for "account number."

In the synonym file, the user enters all forms of the word that the user wants to be considered a synonym. For instance, "e-mail," "email," and "emails" are all variations of e-mail. So the user enters "e-mail," "email," and "emails" into the synonym file and any occurrence of any of the three forms of e-mail listed above will be recorded and counted as "e-mail." In addition, each group of synonyms in a synonym group has an output label which is the unique word that all the synonyms in each synonym group are classified as. The output label for each synonym group is the first word listed in the synonym file. For the "e-mail" example above, the output label is "e-mail" and all variants of "e-mail" will be classified as "e-mail" while in the "account number" example above, the output label is "account number" and all variants of "account number" will be classified as "account number."

An additional feature of the synonym file is that any phrases included in a synonym group are automatically added to the selected phrase list if the phrases are not already in the phrase list or if a phrase file has not been selected. So in the above example, "account number" is a phrase that is in a synonym file. Therefore, count engine 30 counts the phrase "account number" as a single unique word instead of two separate unique words every time count engine 30 encounters together "account number" or any of the synonyms. Therefore, if a user does not select any phrase files at step 66 but includes one or more phrases in a synonym file at step 70, frequency system 10 creates and selects a new phrase file that includes the phrases that are included in the selected synonym file. If the user has selected a phrase file that does not include a phrase that is in the selected synonym file, frequency system 10 adds the phrase in the selected synonym file to the selected phrase file.

Once the user has created or selected the desired phrase file and synonym file, at step 74 the user selects count button 42 and count engine 30 begins the word frequency analysis by selecting the first opening statement to analyze from the list of opening statements. Before counting the unique words in the selected opening statement, count engine 30 removes the punctuation from the selected opening statement at step 76. The opening statements often contain punctuation that may interfere with the correct analysis of word frequencies if not removed before counting the unique words. Such punctuation includes commas, periods, question marks, ellipses, and any other type of punctuation. If count engine 30 did not remove punctuation, then the same unique word may be counted as two separate unique words. For example, the transcripts of two opening statements might include, "I want to pay my bill for January," and "I want to pay my bill, and then change my address." If count engine 30 did not remove the punctuation in the opening statement before counting the words, then count engine 30 counts "bill" as one unique word and "bill," as a different and separate unique word. But with count engine 30 removing the punctuation, the second opening statement becomes "I want to pay my bill and then change my address" and count engine 30 then correctly counts two occurrences of the unique word "bill" in the two opening statements. When removing punctuation, count engine 30 does not remove punctuation within words. For example, count engine 30 does not remove the dash in "e-mail."

GUI 28 further includes punctuation button 48 which when selected allows count engine 30 to replace all ellipses in the opening statements with a space. Count engine 30 replaces the ellipses with a space at the same time that count engine 30 removes the other punctuation in the opening statement. This is an important feature when analyzing transcribed opening statements because generally a transcriber inserts an ellipse into an opening statement when there is a long pause or change of thought by the customer within an opening statement. In the example embodiment, count engine 30 removes the punctuation from the opening statement one opening statement at a time before count engine 30 counts the unique words in the opening statement for which the punctuation was just removed. In alternate embodiments, count engine 30 cycles through every opening statement removing all the punctuation and then cycles back through the opening statements and counts the unique words in the opening statements one statement at a time.

After count engine 30 removes the punctuation from the selected opening statement, count engine 30 reads the selected phrase file and synonym file and counts each unique word in the selected opening statement at step 78 and records in database 20 each occurrence of each unique word from the selected opening statement at step 80. For example, the selected opening statement may be "I want to purchase Call Waiting." When counting unique words, count engine 30 first determines if any of the words in the selected opening statement are listed in the selected phrase file or the selected synonym file. Upon examining the selected phrase file and synonym file, count engine 30 determines that the selected opening statements contains no synonym words but does contain one phrase "Call Waiting." So the selected opening statement includes five unique words: "I,", "want," "to," "purchase," and "Call Waiting."

When recording the occurrence of each unique word in database 20, count engine 30 records in a frequency table in database 20 the unique words and the number of times each unique word appears in the selected opening statement. For the above example selected opening statement, an example frequency table is shown in Table 1. Since this is the first opening statement to be analyzed by count engine 30 for this list of opening statements, count engine 30 creates a new frequency table beginning with the first selected opening statement.

TABLE 1

Example Frequency Table

| Unique Word | Occurrences |
| --- | --- |
| I | 1 |
| Want | 1 |
| To | 1 |
| Purchase | 1 |
| Call Waiting | 1 |

If this was not the first opening statement to be analyzed, then when count engine 30 records each unique word in the frequency table, count engine 30 checks to see if any of the unique words in the selected opening statement are already listed in the frequency table. If any of the unique words in the selected opening statement are already in the frequency table, then the occurrence value in the frequency table for the unique word is incremented by the number of occurrences in the selected opening statement. Count engine 30 adds the unique words not yet in the frequency table to the frequency table. For example, given the frequency table in Table 1 and a selected opening statement of "I need to pay my bill," count engine 30 increments the occurrence value for both "I" and "to" by one and add "need," "pay," "my," and "bill" to the frequency table with each having an occurrence of one.

Once count engine 30 counts and records the unique words in the selected opening statement, at step 84 count engine 30 determines if there are additional opening statements in the selected list of opening statements to be analyzed for word frequencies. If at step 84, there are additional opening statements, then count engine 30 selects the next opening statement to be analyzed at step 86. The method then returns to step 76 and steps 76, 78, 80, 84, and 86 are repeated until there are no additional opening statements to be analyzed at step 84.

When there are no additional opening statements to be analyzed at step 84, then at step 88 count engine 30 determines the frequency of occurrence for each unique word. Count engine 30 determines the frequency of occurrence for each unique word by examining the occurrence values in the frequency table. The occurrence value is how many times a particular unique word appeared in the selected list of opening statements. Once count engine 30 determines the frequency of occurrence, count engine 30 generates an output file including each unique word and its corresponding frequency of occurrence value at step 90 and count engine 30 stores the output file in the location indicated by output screen 36. By selecting sort button 50, the output file is sorted in descending frequency order. If sort button 50 is not selected, the output file is not sorted in descending frequency order and is arranged in the order that count engine 30 encountered each unique word. Having the output file sorted in descending frequency order allows a user of frequency system 10 to quickly determine which unique words are being used most often by customers and create customer-centric menu prompts accordingly. In alternative embodiments, count engine 30 may also sort the output file alphabetically by unique word. Once count engine 30 generates the output file, the method ends at step 92.

In addition to counting the frequency of occurrence for unique words in the opening statements, frequency system 10 also counts clusters of words in the opening statements. If at step 64 the user does not want to perform a word count, then the user can perform a cluster count using frequency system 10. A cluster is a group of two or more words that occur together in an opening statement. When cluster counting, frequency system 10 locates all the unique clusters in the opening statements and determines a cluster frequency of occurrence.

Clusters in the opening statements are important in that clusters can be used to come up with the phrases for the phrase file and to better understand how the customers use words together. For example, a cluster count may return a high frequency of occurrence of "phone" and "bill" being used together as "phone bill." The use of "phone" and "bill" together may indicate that the word count analysis would benefit and have more accurate results if "phone bill" was included as a phrase. In addition, cluster counting may also illustrate other customer word combinations that indicate a common problem such as "telephone won't connect" which is evidence of an widespread service problem that many customers are experiencing if such a cluster has a high cluster frequency of occurrence.

At step 94 the user utilizes cluster control 46 to determine the cluster size for cluster counting. The user may choose a maximum cluster size of two words, three words, four words, or five words. Cluster engine 32 locates clusters up to the maximum size indicated by cluster control 46. For example, a cluster size of three indicates that cluster engine 32 will locate and record all two word and three word clusters in the opening statements. In alternate embodiments, frequency system 10 can perform cluster counting for cluster sizes larger than five words. Once the user selects the cluster size, the user selects cluster button 44 and cluster engine 32 begins cluster counting the selected list of opening statements.

Cluster engine 32 begins by selecting the first opening statement in the selected list of opening statements at step 96 and removing the punctuation from the selected opening statement at step 98 as described above with respect to count engine 30. Once cluster engine 32 removes the punctuation, at step 100 cluster engine 32 locates and records each cluster from the selected opening statement. For instance, the selected opening statement is "I am inquiring about a charge on my phone bill." With a maximum cluster size of two, cluster engine 32 finds the following clusters: "I am," "am inquiring," "inquiring about," "about a," "a charge," "charge on," "on my," "my phone," and "phone bill." With a maximum cluster size of three, cluster engine 32 locates the two-word clusters above plus the following clusters: "I am inquiring," "am inquiring about," "inquiring about a," "about a charge," "a charge on," "charge on my," "on my phone," and "my phone bill." With a maximum cluster size of four, cluster engine 32 locates the two-word and three-word clusters above plus the following clusters: "I am inquiring about," "am inquiring about a," "inquiring about a charge," "about a charge on," "a charge on my," "charge on my phone," and "on my phone bill." With a maximum cluster size of five, cluster engine 32 locates the two-word, three-word, and four-word clusters above and the following clusters: "I am inquiring about a," "am inquiring about a charge," "inquiring about a charge on," "about a charge on my," "a charge on my phone," and "charge on my phone bill."

With the maximum cluster size selected and cluster engine 32 locating the clusters in the selected opening statement, cluster engine 32 records in a cluster frequency table in database 20 each cluster and the number of times each cluster occurs in the selected opening statement. Cluster engine 32 records and stores the clusters and occurrence values in the cluster frequency table in the same manner that count engine 30 records and stores the unique words and occurrence values in the frequency table as described above.

Once cluster engine 32 locates and records all the clusters in the selected opening statement, cluster engine 32 determines if there are additional opening statement to be analyzed using cluster counting at step 102. If there are additional opening statements at step 102, then at step 104 cluster engine 32 selects the next opening statement and repeats steps 98, 100, 102, and 104 until there are no additional opening statements at step 102. When there are no additional opening statements at step 102, at step 106 cluster engine 32 determines the cluster frequency of occurrence in the same manner that count engine 30 determined the frequency of occurrence for the unique words. Cluster engine 32 generates an output file sorted in descending priority value at step 90 if the user has selected sort button 50. If the user has not selected sort button 50, then the output file is sorted by the order in which cluster engine 32 encountered the clusters. Once cluster engine 32 generates the output file, the method ends at step 92.

Although word counting and cluster counting are described above in FIG. 3 as being separately performed, in alternate embodiments frequency system 10, count engine 30, and cluster engine 32 may perform word counting and cluster counting in the same process at the same time without having to cycle through the list of selected opening statements twice which results in either one combined output file or two separate output files depending on user preferences.

Although the present invention has been described in detail, it should be understood that various changes, substitutions and alterations can be made hereto without the parting from the spirit and scope of the invention as defined by the appended claims.

What is claimed is:

1. A method for an automated analysis of word frequencies, the method comprising:
   collecting a plurality of opening statements including a plurality of words, the plurality of words including multiple different transcriptions of a particular word or group of words;
   specifying a synonym group including the multiple different transcriptions of the particular word or group of words;
   establishing a cluster size;
   removing a plurality of punctuation from the opening statements;
   automatically counting each unique word in the opening statements, wherein the multiple different transcriptions of the particular word or group of words specified in the synonym group are treated as a single unique word;
   determining a frequency of occurrence for each of the unique words in the opening statements;
   automatically locating a plurality of clusters in the opening statements;
   determining a cluster frequency of occurrence for each of the clusters;
   storing each of the unique words and a corresponding frequency of occurrence and each of the clusters and a corresponding cluster frequency of occurrence; and
   creating an output file sorted by the frequency of occurrence and the cluster frequency of occurrence and including each unique word, the corresponding frequency of occurrence, each cluster, and the corresponding cluster frequency of occurrence.

2. A method for automating an analysis of word frequencies, the method comprising:
   accessing a plurality of transcribed statements including a plurality of words, the plurality of words including multiple different transcriptions of a particular word or group of words;
   specifying a synonym group including the multiple different transcriptions of the particular word or group of words;
   automatically analyzing the words in the statements;
   determining a frequency of occurrence for each unique word in the statements, wherein the multiple different transcriptions of the particular word or group of words specified in the synonym group are treated as a single unique word; and
   creating an output file including each of the unique words and a corresponding frequency of occurrence.

3. The method of claim 2 wherein the statements comprise customer opening statements.

4. The method of claim 2 wherein the output file comprises a frequency table.

5. The method of claim 2 wherein automatically analyzing the words in the statements comprises removing a plurality of punctuation from the statements.

6. The method of claim 5 wherein removing the punctuation from the statements comprises leaving the punctuation within each of the words.

7. The method of claim 2 wherein automatically analyzing the words in the statements comprises counting each unique word in the statements.

8. The method of claim 7 wherein counting each unique word in the statements comprises counting each of the groups of words as a single unique word.

9. The method of claim 7 wherein counting each of the unique words in the statements comprises counting the multiple different transcriptions of the particular word or group of words specified in the synonym group as a single unique word.

10. The method of claim 2 wherein automatically analyzing the words in the statements comprises:
    establishing a cluster size; and automatically locating a plurality of clusters in the statements.

11. The method of claim 10 further comprising determining a cluster frequency of occurrence for each of the clusters.

12. The method of claim 10 further comprising the output file sorted by cluster frequency of occurrence and including each of the clusters and a corresponding cluster frequency of occurrence.

13. The method of claim 2 further comprising utilizing one or more of the unique words having a high frequency occurrence in one or more customer-centric menu prompts.

14. A system for automating an analysis of word frequencies, the system comprising:
  a plurality of statements including a plurality of words, the plurality of words including multiple different transcriptions of a particular word or group of words;
  a synonym file specifying a synonym group including the multiple different transcriptions of the particular word or group of words;
  a count engine operable to analyze the statements and determine a frequency of occurrence for each unique word in the statements, wherein the multiple different transcriptions of the particular word or group of words specified in the synonym group are treated as a single unique word; and
  a cluster engine associated with the count engine, the cluster engine operable to locate a plurality of clusters in the statements and determine a cluster frequency of occurrence for each of the clusters.

15. The system of claim 14 wherein the statements comprise a plurality of opening statements.

16. The system of claim 14 wherein the count engine is further operable to remove a plurality of punctuation from the statements.

17. The system of claim 16 wherein the count engine removing the punctuation from the statements comprises leaving the punctuation within each of the words.

18. The system of claim 14 wherein the count engine is further operable to generate an output file including each of the unique words and a corresponding frequency of occurrence.

19. The system of claim 14 wherein the count engine counts each of the unique words in the statements.

20. The system of claim 14 further comprising:
  a phrase file including one or more groups of words with each group specified as a unique word.

21. The system of claim 20 wherein the count engine counts each group of words in the phrase file as a single unique word and each word in the synonym group as a single unique word.

22. The system of claim 14 wherein a cluster comprises a grouping of two or more unique words occurring together in the statements.

23. The system of claim 14 wherein the cluster engine is operable to generate an output file including each of the clusters and a corresponding cluster frequency of occurrence.

24. The system of claim 14 further comprising a graphical user interface associated with the count engine and the cluster engine, the graphical user interface including a cluster control and operable to allow for selection of a phrase file and a synonym file.

25. A Computer program product for automating an analysis of word frequencies, the computer program product; and embodied in a computer-readable storage medium and operable to:
  access a plurality of transcribed statements including a plurality of words, the plurality of words including multiple different transcriptions of a particular word or group of words;
  specifying a synonym group including the multiple different transcriptions of the particular word or group of words;
  automatically analyze the words in the statements;
  determine a frequency of occurrence for each unique word in the statements, wherein the multiple different transcriptions of the particular word or group of words specified in the synonym group are treated as a single unique word; and
  create an output file including each of the unique words and a corresponding frequency of occurrence.

26. The medium of claim 25 wherein the output file comprises a frequency table.

27. The medium of claim 25 wherein automatically analyzing the words in the statements comprises removing a plurality of punctuation from the statements.

28. The medium of claim 25 wherein automatically analyzing the words in the statements comprises counting each unique word in the statements.

29. The medium of claim 28 wherein counting each of the unique words in the statements comprises counting a group of words as a single unique word.

30. The medium of claim 28 wherein counting each of the unique words in the statements comprises counting the words in the synonym group as a single unique word.

31. The medium of claim 25 wherein automatically analyzing the words in the statements comprises:
  establishing a cluster size; and
  automatically locating a plurality of clusters in the statements.

32. The medium of claim 31 further comprising determining a cluster frequency of occurrence for each of the clusters.

33. The medium of claim 25 further operable to store the unique words and the corresponding frequency of occurrence in a database.

* * * * *

UNITED STATES PATENT AND TRADEMARK OFFICE
CERTIFICATE OF CORRECTION

| | | |
|---|---|---|
| PATENT NO. | : 7,131,117 B2 | Page 1 of 1 |
| APPLICATION NO. | : 10/234398 | |
| DATED | : October 31, 2006 | |
| INVENTOR(S) | : Mills et al. | |

It is certified that error appears in the above-identified patent and that said Letters Patent is hereby corrected as shown below:

In column 12, line 8, delete "; and" after "product".

Signed and Sealed this

Twenty-eighth Day of August, 2007

JON W. DUDAS
*Director of the United States Patent and Trademark Office*